United States Patent [19]

Katohno et al.

[11] Patent Number: 5,301,073
[45] Date of Patent: Apr. 5, 1994

[54] TAKE-UP PULLEY WITH TORQUE-LIMITING MECHANISM FOR MAGNETIC RECORDING AND REPRODUCING APPARATUS

[75] Inventors: Noboru Katohno, Mito; Masaki Yono, Kudamatsu; Yasuhiro Hashiguchi, Mito, all of Japan

[73] Assignee: Hitachi, Ltd., Tokyo, Japan

[21] Appl. No.: 857,659

[22] Filed: Mar. 26, 1992

[30] Foreign Application Priority Data

May 29, 1991 [JP] Japan .................................. 3-152166

[51] Int. Cl.⁵ .................... G11B 15/00; F16D 3/64; F16H 35/10
[52] U.S. Cl. .................... 360/96.3; 360/93; 464/30; 242/201; 74/411
[58] Field of Search .................... 360/84, 85, 90, 93, 360/95, 96.3, 96.5; 242/200, 201, 204, 208; 464/30, 37, 41, 75, 77, 89, 160; 74/409, 411, 433, 440

[56] References Cited

U.S. PATENT DOCUMENTS

| | | | |
|---|---|---|---|
| 2,255,742 | 9/1941 | Schilling | 464/41 |
| 2,868,001 | 1/1959 | Russell | 464/30 |
| 3,053,362 | 9/1962 | Doble et al. | 464/30 |
| 3,320,772 | 5/1967 | Saxton | 464/30 |
| 3,696,775 | 10/1972 | Markart | 116/67 A |
| 4,139,169 | 2/1979 | Kono | 242/201 |
| 4,228,972 | 10/1980 | Koppensteiner | 242/201 |
| 4,594,624 | 6/1986 | Kanchiku et al. | 360/90 |
| 4,674,351 | 6/1987 | Byrd | 74/411 |
| 5,054,711 | 10/1991 | Kato | 360/96.3 |
| 5,170,676 | 12/1992 | Matouka et al. | 464/30 |

FOREIGN PATENT DOCUMENTS

| | | |
|---|---|---|
| 048516 | 3/1982 | European Pat. Off. . |
| 193243 | 9/1986 | European Pat. Off. . |
| 3245470 | 7/1983 | Fed. Rep. of Germany . |
| 58-53049 | 3/1983 | Japan . |
| 1188645 | 4/1970 | United Kingdom . |
| 1577314 | 10/1980 | United Kingdom . |

Primary Examiner—Stuart S. Levy
Assistant Examiner—Jefferson Evans
Attorney, Agent, or Firm—Antonelli, Terry, Stout & Kraus

[57] ABSTRACT

A take-up pulley is provided with a power input member and a power output member which are radially divided, both of the members being engaged with each other over their peripheral surfaces. An elastic force of an annular elastic member acts on the engagement portion between both the power output member and the power input member in the peripheral direction in order to obtain a predetermined frictional engagement force between the power input member and the power output member.

7 Claims, 4 Drawing Sheets

TAKE-UP PULLEY WITH TORQUE-LIMITING MECHANISM FOR MAGNETIC RECORDING AND REPRODUCING APPARATUS

BACKGROUND OF THE INVENTION

The present invention relates to a magnetic and reproducing apparatus such as a video tape recorder for domestic use (a household VTR), and more particularly, to a rotational force control mechanism for a reel drive device in the magnetic recording and reproducing apparatus.

Conventionally, as disclosed in Japanese Patent Publication No. 2-10499B (58-53049A), for example, a belt (a rubber belt or the like) having a rectangular cross-section is used for transmission of a rotational force from a capstan motor to a take-up pulley to drive a reel. Little notice is normally taken of controlling the rotational force to be transmitted between the capstan motor and the take-up pulley.

As in the above-described prior art, when a rubber belt is used for power transmission, a reliability of the belt to transmit the power is sometimes lowered due to deterioration of the rubber under long use. In order to solve the problem, a so-called toothed belt which is provided with a number of teeth (projections) has recently been used to transmit the power in order to ensure a reliability over a long period of time.

Here, the toothed belt will be explained more in detail. In the toothed belt, generally, high-strength plastic fibers are provided in a core portion so as to obtain a longtime reliability; a soft material such as urethane resin is coated on an outer side of the belt; and a number of teeth (projections) are provided on an inner side of the belt for the purpose of securely transmitting the power. In case of using the toothed belt, a belt pulley of the capstan motor and the take-up pulley, between which the toothed belt is extended, are formed on their outer peripheries with toothed portions corresponding to the teeth (projections) of the toothed belt. In a rotational force transmitting mechanism utilizing the toothed belt constructed in the above-mentioned manner, if an excessive power is applied between the teeth of the toothed belt and the toothed portions of the pulleys when the capstan motor is rapidly started or stopped or when an extraordinarily large load is applied serious accident such as damage of the teeth of the toothed belt or cutting of the belt may occur.

In order to prevent these accidents, it is known to provide a rotational force control device in the toothed belt rotational force transmitting mechanism. More specifically, in the case where an excessive load over a certain value (allowable value) is applied to the toothed belt rotational force transmitting mechanism, a predetermined portion of the mechanism is designed to race upon application of a predetermined rotational force, to thereby prevent the members of the mechanism from damage. In a conventional rotational force control mechanism, however, as disclosed in the aforementioned Japanese Patent Publication No. 2-10499B (58-53049A), a so-called opposed disk frictional type clutch mechanism is used in which disk-like rotary members are pressed against each other from the outer sides thereof by means of spring members with a frictional member such as a wool felt interposed between the rotary members. This structure involves such disadvantages as to require a number of component parts, to bring about a high cost and to increase the size of the mechanism.

In view of the above-described problems, the present invention aims to provide a magnetic recording and reproducing apparatus including a rotational force control mechanism with a simplified structure which enables reduction in cost and size of the magnetic recording and reproducing apparatus.

SUMMARY OF THE INVENTION

In order to achieve the aforesaid object, the invention is arranged in such a manner that a take-up pulley which receives a rotational force of a capstan motor is divided into a power input section and a power output section, the power input section and the power output section being engaged with each other with a frictional force acting therebetween in the peripheral direction, so that a rotational force control mechanism having a simple structure with a reduced size is obtained.

By provision of an annular elastic material so as to bias an inner peripheral portion of the power input member of the take-up pulley and an outer peripheral portion of the power output member against each other with a certain force, it becomes possible to attain a desired frictional engagement force, which prevents the mechanism from being damaged.

DESCRIPTION OF THE PREFERRED EMBODIMENT

Figure 1:
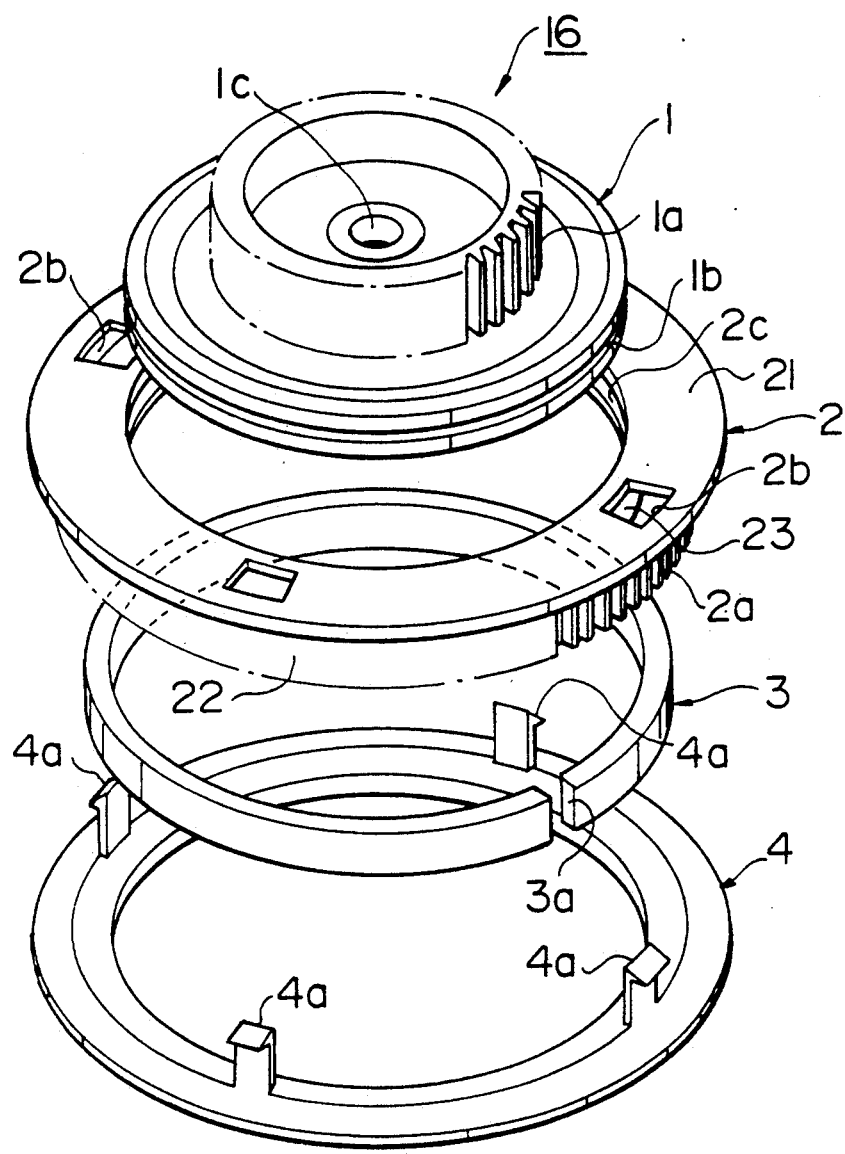
FIG. 1 is an exploded perspective view of a take-up pulley which constitutes an essential portion of a magnetic recording and reproducing apparatus according to the present invention.

Preferred embodiments of the invention will be described hereinafter with reference to the accompanying drawings.

At first, a whole structure of a video tape recorder according to the invention will be explained with reference to FIGS. 4 and 5. As shown in FIG. 5, a magnetic tape 8a contained in a cassette 8 and wound around a pair of tape reels 9, 9A is withdrawn out of the cassette 8 by a publicly-known loading mechanism, and then wound around a rotary cylinder 7 with a magnetic head (not shown) mounted thereon, for carrying out a predetermined recording and reproducing operation. In order to take up the magnetic tape 8a contained in the cassette 8, either of a supply side reel table 10 and a take-up side reel table 11 with which the pair of tape reels 9, 9A are engaged, respectively, is rotatively driven by use of a power from a capstan motor 6 (FIG. 4) for driving a capstan 6b.

Figure 4:
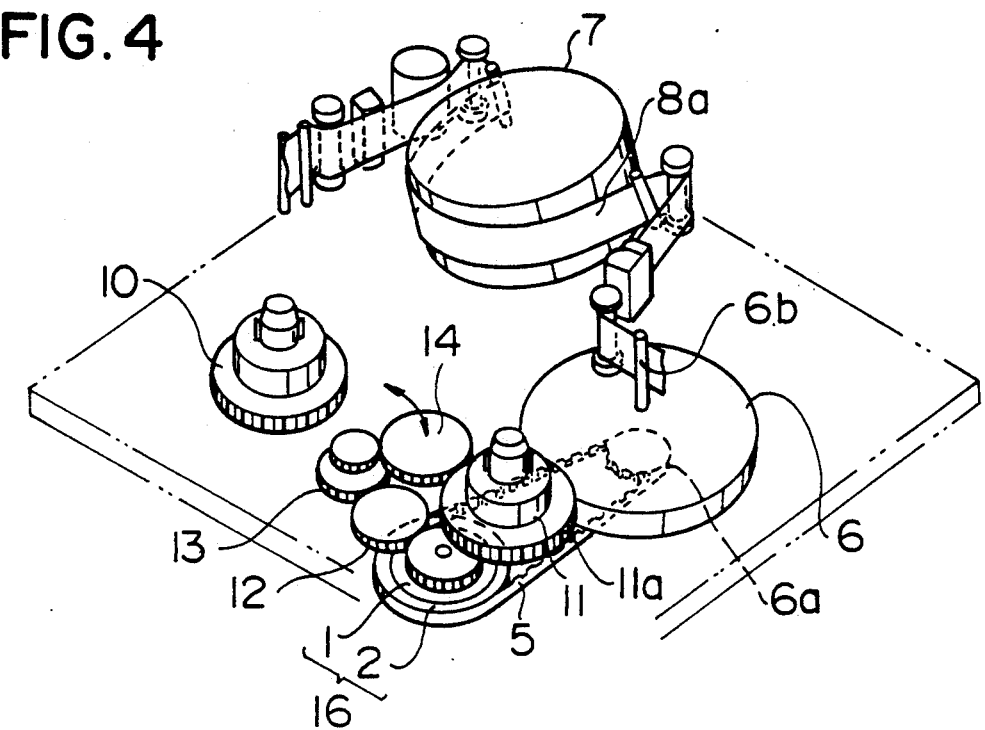
FIG. 4 is a perspective view illustrative of a main portion of a video tape recorder according to the invention.
Figure 5:
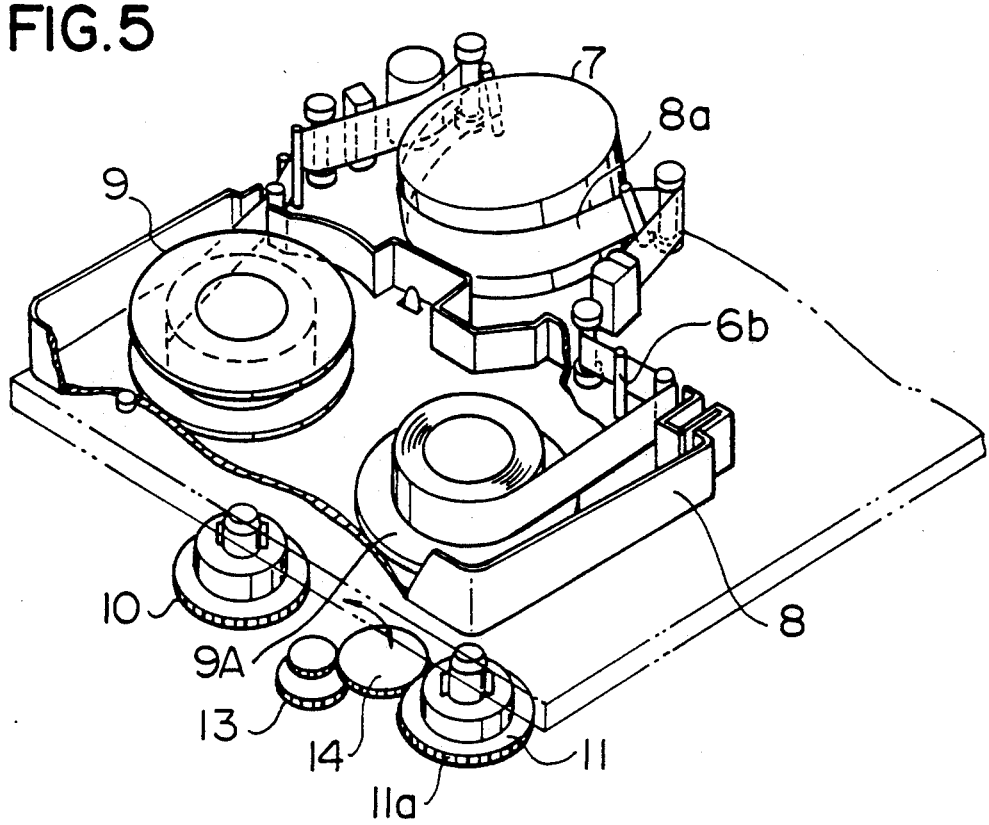
FIG. 5 is a perspective view showing a state wherein a cassette is mounted on the video tape recorder illustrated in FIG. 4.

As shown in FIG. 4, a toothed belt 5 is extended between a belt pulley 6a provided below the capstan motor 6 and a take-up pulley 16. Each of the belt pulley 6a and the take-up pulley 16 includes a toothed portion formed on its outer periphery, the toothed portion corresponding to teeth (projections) of the toothed belt 5, for the purpose of securely transmitting power. Reference numeral 12 designates an intermediate gear, the gear being arranged to mesh with a gear portion 1a of a power output member 1 of the take-up pulley 16 which will be described below. The intermediate gear 12 also meshes with a drive gear 13 to be meshed with a pendulum gear 14. The pendulum gear 14 is swung back and forth by a publicly-known oscillating mechanism (not shown) in accordance with a rotating direction of the capstan motor 6 and selectively meshes with a gear portion of the supply side reel table 10 or a gear portion 11a the take-up side reel table 11. In FIGS. 4 and 5, there is illustrated a case in which the pendulum gear 14 meshes with the gear portion 11a of the take-up side reel table 11. In this case, the rotational force of the capstan motor 6 for running the tape 8a in a normal direction is transmitted to the take-up side reel table 11 so that the magnetic tape 8a is wound around the tape reel 9a engaged with the take-up side reel table 11.

As shown in FIG. 1, the take-up pulley 16 comprises a power output member 1, a power input member 2, an annular elastic member 3 and a pressing member 4. The power input member 2 is an annular member and includes an upper plane portion 21, an outer cylindrical portion 22, and an inner cylindrical portion 23 elastically deformable and relatively small in thickness. The outer cylindrical portion 22 is formed on its outer periphery with a toothed portion 2a corresponding to the teeth (projections) of the toothed belt 5. The upper plane portion 21 possesses stepped engagement sections 2b provided at four positions and windows 2d formed at the engagement portions. An inner peripheral surface of the elastically deformable and relatively thin inner cylindrical portion 23 is constituted as an engaging part 2c. Meanwhile, the power output member 1 includes a gear portion 1a formed on its upper outer periphery, an axial hole 1c formed along its rotational center axis, and an engaging part 1b formed on its lower outer periphery. The gear portion 1a is meshed with the intermediate gear 12 to thereby output the power (rotational force). The power input member 2 and the power output member 1 constituted in the above-described manner are assembled with each other by inserting and fitting the engaging part 1b of the power output member 1 in the engaging part 2c of the power input member 2.

Figure 2:
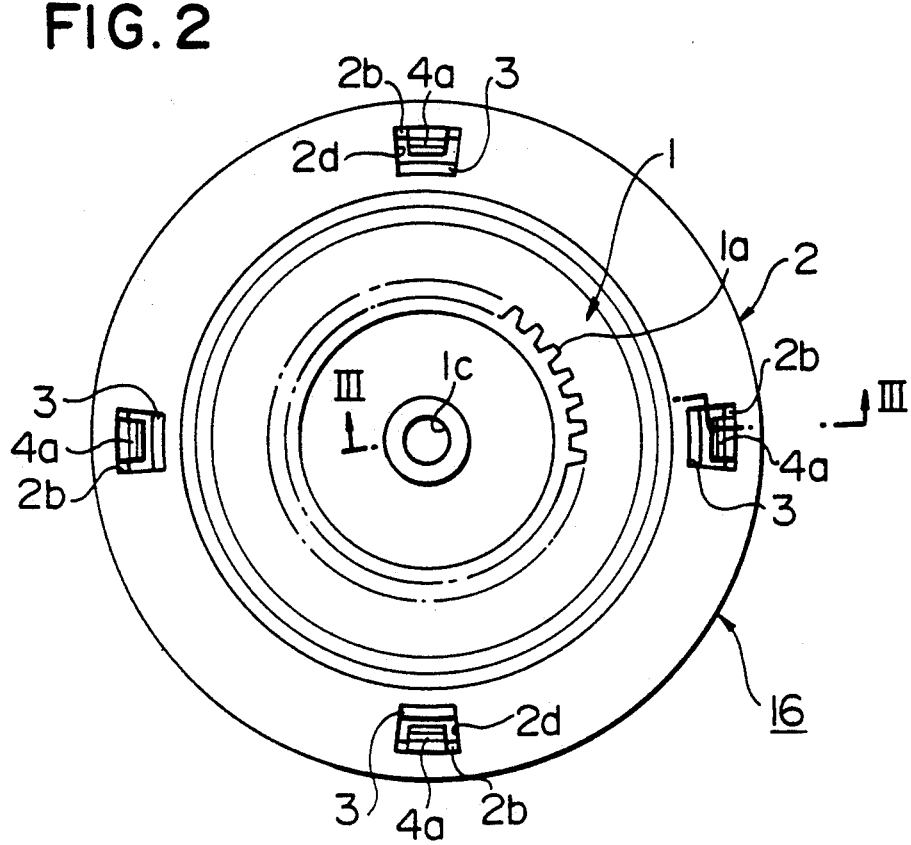
FIG. 2 is a top plan view of the take-up pulley shown in FIG. 1.
Figure 3A:
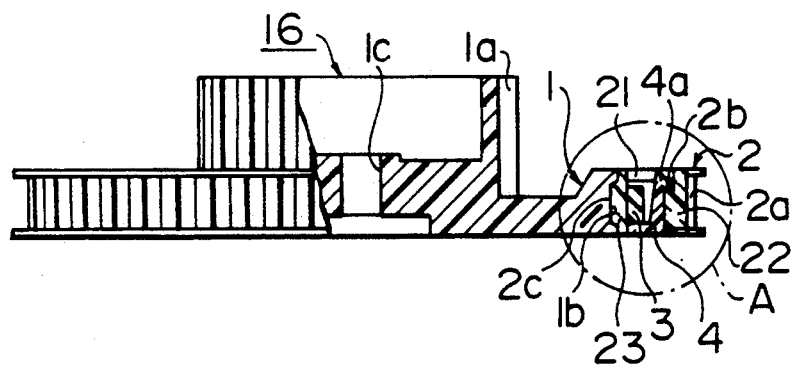
FIG. 3A is a side elevational view of the taken along a line III—III of FIG. 2.
Figure 3B:
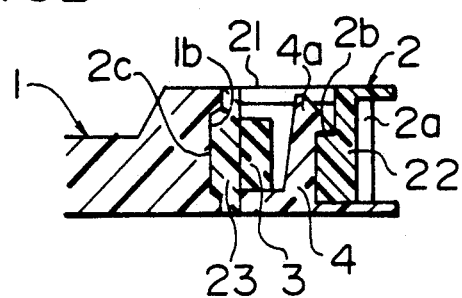
FIG. 3B is an enlarged view of a main portion A of FIG. 3A.

Thereafter, as illustrated in FIGS. 2, 3A and 3B, the annular elastic member 3 made a material such as spring stainless steel and having a cut-out portion 3a at one portion is fitted on the outer periphery of the inner cylindrical portion 23 of the power input member 2 while the cut-out portion 3a is enlarged. Thus, a restoring elastic force of the elastic member 3 acts on the engaging part 1b of the power output member 1 and the engaging part 2c of the power input member 2 in contact with each other over their peripheral surfaces (on an engaging and connecting portion between the power output member 1 and the power input member 2) so that the power input member 2 and the power output member 1 are united to each other with a certain frictional engagement force. Then, claws 4a of the pressing member 4 are confronted with the engagement sections 2b of the power input member 2 and the claws 4a are forced into the engagement sections 2b, thereby combining the pressing member 4 with the power input member 2 by so-called snap-in engagement. As a result, the elastic member 3 is prevented from being disconnected from the power input member 2. In this way, assembly of the take-up pulley 16 is completed.

The take-up pulley 16 constituted in this manner is provided in a transmitting mechanism between the belt pulley 6a of the capstan motor 6 and the reel tables 10, 11, whereby the reel table 10 or 11 is normally driven for smooth rotation by the rotation of the capstan motor 6. At the same time, even if the capstan motor is rapidly started or stopped, or even if an excessive load is applied to a reel drive system, there is no possibility of damage to the mechanism because the torque transmitted to the toothed belt 5 and the related portion is controlled thanks to the existence of the frictional engagement part in the take-up pulley 16. Further, since a peripheral surface opposition torque limiter (rotational force control mechanism) is constructed by utilizing the inexpensive elastic member 3 formed from an annular curved metallic spring plate, it is possible to reduce the cost of manufacturing the apparatus due to simplification of the mechanism as well as reduce the apparatus in size and thickness.

Figure 3C:
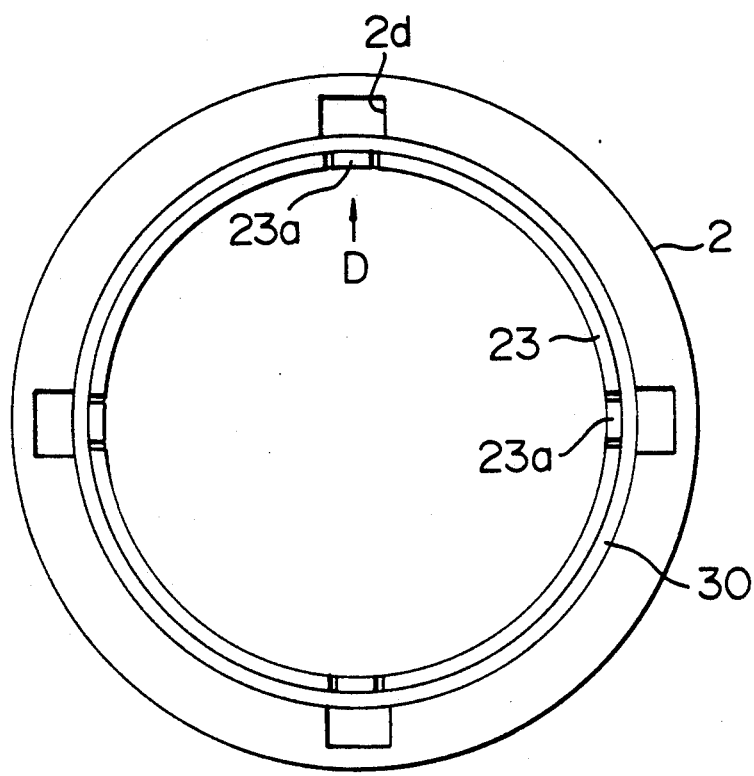
FIG. 3C is a bottom view showing another embodiment of the input member illustrated in FIG. 3A.
Figure 3D:
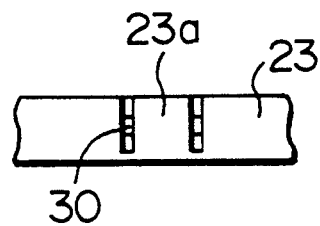
FIG. 3D is a side elevational view of an essential portion indicated by an arrow D in FIG. 3C.

Additionally, as indicated in a further embodiment shown in FIGS. 3C and 3D in which the same numerals designate the same or identical parts as in first embodiment, the cylindrical portion 23 is provided with elastic deformable pieces 23a having a thickness slightly larger than the remaining portion of the cylindrical portion 23 at positions corresponding to the windows 2d, to form the engaging part 2c on the inner side of the elastic deformable pieces 23a. The elastic deformable pieces 23a are inwardly distorted by a metallic wire 30 with a substantially circular cross-section so as to be engaged with the engaging part 1b of the outer member 1.

Though the invention has been described so far with reference to the embodiments shown in the drawings, it is needless to say that the invention can be varied in various ways by the persons skilled in the art within a range which does not deviate from the intention of the invention. More specifically, the engagement relation between the outer periphery of the power output member and the inner periphery of the power input member may be changed reversely to the above-described embodiment. The annular elastic member may be provided in such a manner that the elastic force acts on the engaging and connecting portion between the power output member and the power input member from the inner side of the engaging and connecting portion. Further, the annular elastic member may be formed with slits appropriately at positions generating a restoring force in order to increase an extent of the elastic deformation.

As mentioned above, according to the invention, the rotational force control mechanism with an extremely simple structure can be obtained. Particularly, because of the frictional transmitting mechanism operating in the peripheral direction, the cost reduction due to the simplification of the mechanism and the reduction in size and thickness of the apparatus can be realized simultaneously. The effect of the invention can be recognized remarkably in the magnetic recording/ playback apparatus such as various kinds of household VTRS.

What is claimed is:

1. A magnetic recording and reproducing apparatus comprising
- a rotary cylinder with a magnetic head mounted thereon,
- means for withdrawing a magnetic tape wound around two tape reels in a cassette so as to wind the magnetic tape around the rotary cylinder for use in carrying out a recording and reproducing operation,
- a capstan motor for driving a capstan for transporting the magnetic tape,
- a belt pulley provided on said capstan motor,
- a take-up side pulley connected to said belt pulley through a toothed belt,
- a take-up side reel table for engaging one of the tape reels of said cassette,
- a supply side reel table for engaging the other of the tape reels of said cassette, and
- an intermediate gear for selectively transmitting rotation of said capstan motor to said take-up side reel table or said supply side reel table,
- wherein said take-up pulley includes
- a power input member which has a cylinder engaging part and to which rotational force is input from said toothed belt, said cylindrical engaging part of said power input member including at least one elastically deformable portion,
- a power output member which has a cylindrical engaging part for coupling with said cylindrical engaging part of said power input member so as to output to said intermediate gear the rotational force input to said power input member, and
- an annular elastic member for uniting said cylindrical engaging part of said power output member and said cylindrical engaging part of said power input member to each other via at least said at least one elastically deformable portion of said cylindrical engaging part of said power input member with a frictional engagement force.

2. A magnetic recording and reproducing apparatus according to claim 1, wherein said annular elastic member is an annularly curved metallic spring plate.

3. A magnetic recording and reproducing apparatus according to claim 2, wherein said take-up pulley further includes a pressing member for preventing said annular elastic member from being disconnected from the power input member.

4. A magnetic recording and reproducing apparatus according to claim 3, wherein the cylindrical engaging part of said power input member is constituted by an inner surface of an inner cylindrical portion of said power input member, said inner cylindrical portion having a small thickness, the cylindrical engaging part of said power output member couples with the cylindrical engaging part of said power input member, an said annular elastic member is elastically deformed and fitted on an outer peripheral surface of an outer cylindrical portion of said power input member.

5. A magnetic recording and reproducing apparatus according to claim 3, wherein said cylindrical engaging portion of said power input member includes a plurality of elastically deformable portions slightly larger in thickness than remaining portions of said cylindrical engaging portion of said power input member, and said plurality of elastically deformable portions are distorted inwardly by said annular elastic member.

6. A magnetic recording and reproducing apparatus according to claim 2, wherein the cylindrical engaging part of said power input member is constituted by an inner surface of an inner cylindrical portion of said power input member, said inner cylindrical portion having a small thickness, the cylindrical engaging part of said power output member couples with the cylindrical engaging part of said power input member, and said annular elastic member is elastically deformed and fitted on an outer peripheral surface of an outer cylindrical portion of said power input member.

7. A magnetic recording and reproducing apparatus according to claim 2, wherein said cylindrical engaging part of said power input member includes a plurality of elastically deformable portions slightly larger in thickness than remaining portions of said cylindrical engaging part of said power input member, and said plurality of elastically deformable portions are distorted inwardly by said annular elastic member.

* * * * *